F. P. D'ARCY.
HOSE CLAMP.
APPLICATION FILED FEB. 7, 1919.
1,304,546.
Patented May 27, 1919.
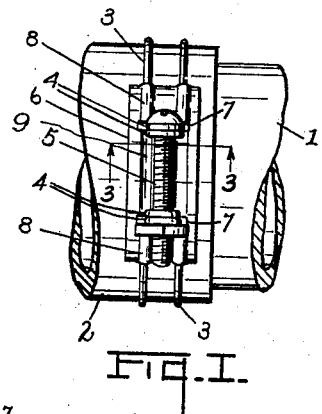
Fig. I.
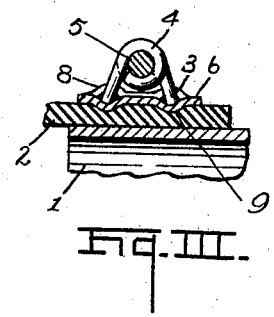
Fig. III.
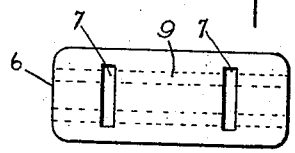
Fig. II.
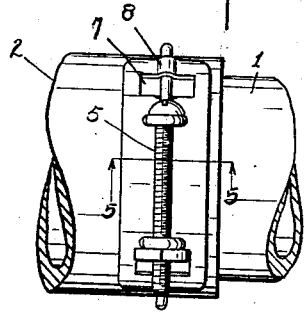
Fig. IV.
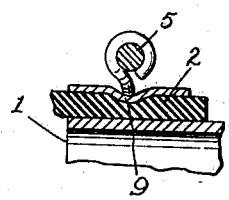
Fig. V.
Witnesses
Linn Gilman
M. Louise Thurston
Inventor
FRANK P. D'ARCY
By Chappell & Earl
Attorneys

UNITED STATES PATENT OFFICE.

FRANK P. D'ARCY, OF KALAMAZOO, MICHIGAN.

HOSE-CLAMP.

1,304,546.   Specification of Letters Patent.   Patented May 27, 1919.

Application filed February 7, 1919. Serial No. 275,573.

*To all whom it may concern:*

Be it known that I, FRANK P. D'ARCY, a citizen of the United States, residing in the city and county of Kalamazoo, State of Michigan, have invented certain new and useful Improvements in Hose-Clamps, of which the following is a specification.

This invention relates to improvements in hose clamps.

The main object of this invention is to provide an improved hose clamp formed mainly of wire which does not injure the hose to which it is applied and which is simple and economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a view of my improved hose clamp applied to a hose, the hose and the connection to which it is applied being shown broken away.

Fig. II is a plan view of the blank from which the bridge piece is formed.

Fig. III is a detail section on a line corresponding to line 3—3 of Fig. I.

Fig. IV is an elevation corresponding to that of Fig. I, showing my improvements embodied in a clamp having a single band.

Fig. V is a detail section on a line corresponding to line 5—5 of Fig. IV.

In the drawing similar reference characters refer to similar parts throughout the several views, and the sectional views are taken looking in the direction of the little arrows at the ends of the section lines.

Referring to the drawing, 1 represents the end of a pipe or connection and 2 a piece of hose applied thereto.

My improved clamp comprises a body 3 preferably formed of wire. The embodiment shown in Figs. I and III has a pair of encircling bands. This body has out-turned eyes 4 at its ends adapted to receive the clamping bolt 5. The bridge piece 6 is formed of sheet metal and has transverse slots 7 near its ends through which the eyes 4 may be passed so that the ends of the body lie above the bridge and may be adjusted thereon.

At the outside of the slots 7 the bridge piece is preferably outwardly beaded at 8 to receive the body while between the slots it is inwardly beaded at 9 to receive the ends of the body and also to provide an engaging bead, as shown in Figs. III and V.

In the embodiment shown in Figs. IV and V the body is a single band.

My improved hose clamp is very efficient as there is a complete encircling of the hose and it is not possible for the hose to work up or bulge up between the ends of the band as sometimes occurs in the type of clamps having tongues bridging the space between the ends of the body. Further, the clamp may be easily drawn up as the ends of the bands slide freely over the bridge piece and there are no projecting parts such as bridging tongues to embed or gouge into the hose.

My improved clamp is simple to produce as it is practical to form the band of pieces of scrap wire such as are found in spring factories and the like and the bridge members may also be formed of scrap material.

Having thus described my invention, what I claim as new and desire to secure by Letters Patent, is:

1. A hose clamp comprising a wire body having integral out-turned bolt eyes at its ends, a clamping bolt disposed through said eyes, and a bridge piece of sheet metal having transverse slots near its ends permitting the insertion and removal of said eyes therethrough and through which the ends of the body are disposed for adjustment, said bridge piece being outwardly beaded at the outside of said slots and inwardly beaded between said slots in alinement with and to receive said body and provide an engaging rib.

2. A hose clamp comprising a wire body having integral out-turned bolt eyes at its ends, a clamping bolt disposed through said eyes, and a bridge piece of sheet metal having transverse slots near its ends permitting the insertion and removal of said eyes therethrough and through which the ends of the body are disposed for adjustment.

3. A hose clamp comprising a wire body having integral out-turned bolt eyes at its ends, a clamping bolt disposed through said eyes, and a bridge piece through which the ends of the body are disposed for adjustment, said bridge piece being inwardly beaded in alinement with and to receive said body and provide an engaging rib.

4. A hose clamp comprising a wire body having integral out-turned bolt eyes at its ends, a clamping bolt disposed through said eyes, and a bridge piece through which the ends of the body are disposed for adjustment.

5. A hose clamp comprising a wire body, and a bridge piece through which the ends of said body are disposed and over which they may be drawn, and a clamping bolt connecting the ends of said body above said bridge piece.

6. A hose clamp comprising a band or body, a bridge piece through which the ends of said band are disposed and slidably associated, and a clamping bolt connecting the ends of said body above said bridge piece.

In witness whereof, I have hereunto set my hand and seal in the presence of two witnesses.

FRANK P. D'ARCY. [L. S.]

Witnesses:
LUELLA G. GREENFIELD,
MARGARET L. GLASGOW.

Copies of this patent may be obtained for five cents each, by addressing the "Commissioner of Patents, Washington, D. C."